US012736150B2

(12) United States Patent
Kawamoto et al.

(10) Patent No.: US 12,736,150 B2
(45) Date of Patent: Sep. 15, 2026

(54) FLOW RATE CONTROL DEVICE

(71) Applicant: TOFLO CORPORATION, Tokyo (JP)

(72) Inventors: Takahiro Kawamoto, Tokyo (JP); Hiroyoshi Amano, Tokyo (JP); Taichi Baba, Tokyo (JP); Kurumi Chino, Tokyo (JP)

(73) Assignee: TOFLO CORPORATION, Tokyo (JP)

( * ) Notice: Subject to any disclaimer, the term of this patent is extended or adjusted under 35 U.S.C. 154(b) by 0 days.

(21) Appl. No.: 18/386,779

(22) Filed: Nov. 3, 2023

(65) Prior Publication Data

US 2024/0410490 A1 Dec. 12, 2024

(30) Foreign Application Priority Data

Jun. 8, 2023 (JP) ................................ 2023-094539

(51) Int. Cl.
*F16K 31/04* (2006.01)
*B22D 17/22* (2006.01)
*F16K 11/072* (2006.01)

(52) U.S. Cl.
CPC .......... *F16K 31/042* (2013.01); *F16K 11/072* (2013.01); *B22D 17/2218* (2013.01)

(58) Field of Classification Search
CPC ................ F16K 31/042; F16K 11/072; B22D 17/2218
See application file for complete search history.

(56) References Cited

U.S. PATENT DOCUMENTS 4,572,239 A * 2/1986 Koch .................... F16K 27/067 251/286
5,325,729 A * 7/1994 Goodson ................ G01F 1/115 73/861.94
5,441,080 A * 8/1995 Baumann ............. F16K 11/052 251/258
2007/0199601 A1 8/2007 Imhof
2013/0134334 A1* 5/2013 Denat ................ F16K 37/0083 251/129.01

(Continued)

FOREIGN PATENT DOCUMENTS

CN 1185525 A * 6/1998
CN 1326062 A 12/2001

(Continued)

*Primary Examiner* — Angelisa L. Hicks
(74) *Attorney, Agent, or Firm* — Bridgeway IP Law Group, PLLC; Sang Ho Lee; Hyun Woo Shin

(57) ABSTRACT

Provided is a flow rate control device capable of suppressing variation of supply pressure caused by variation of set flow rate and suppressing influence of pressure loss and cavitation on a secondary side. The flow rate control device includes: a flow rate regulating valve that regulates a flow rate of fluid flowing in a flow path; a flow meter that measures the flow rate of the fluid flowing in the flow path; and a control portion that controls an opening degree of the flow rate regulating valve based on a measurement result of the flow meter, the flow rate regulating valve is a three-way valve for dividing to regulate fluid flowing in from an inflow port to a first outflow port and a second outflow port, the flow meter is connected to the second outflow port side, and a multistage throttle orifice for decompressing the pressure of the fluid in stages is provided on the first outflow port side.

12 Claims, 14 Drawing Sheets

(56) References Cited

U.S. PATENT DOCUMENTS

| | | | | |
|---|---|---|---|---|
| 2021/0039129 | A1* | 2/2021 | Bolan | B05B 17/08 |
| 2022/0062981 | A1* | 3/2022 | Shimizu | B22D 17/24 |

FOREIGN PATENT DOCUMENTS

| | | | | | |
|---|---|---|---|---|---|
| CN | 201396139 | Y | | 2/2010 | |
| CN | 102767631 | A | | 11/2012 | |
| CN | 204042082 | U | | 12/2014 | |
| CN | 104481948 | A | | 4/2015 | |
| CN | 204459771 | U | | 7/2015 | |
| CN | 105299297 | A | | 2/2016 | |
| CN | 105659177 | A | | 6/2016 | |
| CN | 205601113 | U | | 9/2016 | |
| CN | 107676506 | A | | 2/2018 | |
| CN | 107883051 | A | | 4/2018 | |
| CN | 109114259 | A | | 1/2019 | |
| CN | 109642812 | A | | 4/2019 | |
| CN | 111033147 | A | | 4/2020 | |
| CN | 210600649 | U | * | 5/2020 | |
| CN | 111473143 | A | | 7/2020 | |
| CN | 212777826 | U | * | 3/2021 | F24F 11/54 |
| CN | 114910128 | A | | 8/2022 | |
| JP | 59-82143 | A | | 5/1984 | |
| JP | 02-258139 | A | | 10/1990 | |
| JP | H1182861 | A | * | 3/1999 | F16L 55/00 |
| JP | 2005-194970 | A | | 7/2005 | |
| JP | 2007-015019 | A | | 1/2007 | |
| JP | 2009-202196 | A | | 9/2009 | |
| JP | 2012-152816 | A | | 8/2012 | |
| JP | 5294501 | B2 | * | 9/2013 | |
| JP | 6844938 | B1 | | 3/2021 | |
| JP | 7128023 | B2 | * | 8/2022 | |
| KR | 10-2001-0106803 | A | | 12/2001 | |
| KR | 2014121584 | A | * | 10/2014 | |
| TW | 201241588 | A | | 10/2012 | |

* cited by examiner

FLOW RATE CONTROL DEVICE

CROSS-REFERENCE TO RELATED APPLICATION

This application claims priority to and the benefit of Japanese Patent Application No. 2023-094539 filed on Jun. 8, 2023, the entire contents of which are incorporated herein by reference.

TECHNICAL FIELD

The present invention relates to a flow rate control device capable of suppressing variation of supply pressure caused by variation of set flow rate and suppressing influence of pressure loss and cavitation on a secondary side.

BACKGROUND

For example Patent Document 1 discloses a system utilizing a flow rate control device for controlling an instantaneous flow rate of cooling water when controlling a mold temperature. The flow rate control device includes a flow rate regulating valve, a flow meter, and a controller, and is constituted that a two-way valve is used for the flow rate regulating valve, an instantaneous flow rate of cooling water flowing in one direction is measured by the flow meter, and the controller performs feedback control on the opening degree of the flow rate regulating valve based on the measurement result.

However, in the case of a large number of piping systems used for die casting mold as the mold temperature control system of Patent Document 1 etc., if a pump is provided for each piping system, there are many disadvantages such as cost and/or arrangement space problems, and so on, therefore, a pump is usually branched to a plurality of piping systems. In this case, if the set flow rate is varied, there is a problem that the supply pressure varies along the Q-H curve of the pump. In addition, if the set flow rate is changed per each piping system, the initial pressure will vary according to the set flow rate, there are problems that respective piping systems will interfere with each other, the instantaneous flow rate cannot be controlled at the expected response speed.

As a method of solving this problem, there is a known method in which an inverter and a pressure sensor are generally provided on the pump and a rotational speed of the pump is controlled in such a manner that the pressure is constant (for example, referring to Patent Document 2). However, since the frequency range in which the pump can be adjusted is limited to some extent, when the set flow rate of the flow rate control device is set to be completely closed (set flow rate 0 L) and the set flow rate becomes extremely small, there is a problem that the pressure adjustment cannot be completely corresponded. For example, when heating from the beginning of temperature adjustment or standby state of the mold, in order to improve the heating speed and exert the energy saving effect, usually the flow rate of cooling water is set as much as possible to be used in the heating process and the above-mentioned method is difficult to cope with such an application.

In addition, with regard to response, the rapid rotational speed variation of the pump also becomes the reason of failure, thus it is necessary to vary the rotational speed slowly, and there is also a problem that rapid variation of flow rate cannot be coped with. This is because, if the set flow rate becomes a wide range, the rotation frequency of the pump is also widened, resulting in a delay in response. It should be stated that since mutual interference occurs between the pressure control of the pump and the flow rate control device, the response speed of the flow rate control device needs to be slower than the response speed of the pump in order to prevent such interference, and there is a problem that the original response performance cannot be exerted.

PRIOR ART DOCUMENT

Patent Document

Patent Document 1: Japanese Patent 6844938

Patent Document 2: Japanese Patent Application Laid-Open 2005-194970

SUMMARY

Technical Problem

Therefore, as a method for preventing the interference of the pressure variation described above, a method for controlling the flow rate by using a three-way valve instead of a two-way valve as a flow rate regulating valve in the mold temperature control system of Patent Document 1 is considered. The usual flow rate characteristics of the two-way valve is as shown in FIG. 7, the flow rate varies according to the opening degree, thus along with this, the supply pressure of the pump will vary along the Q-H curve. In contrast to this, the usual flow rate characteristics of the three-way valve is as shown in FIG. 8, although the flow rate flowing to the A port and the B port vary according to the opening degree, the total flow rate flowing to the C port becomes substantially constant, thus the supply pressure of the pump becomes substantially constant even if the opening degree is varied. With this characteristic, the flow rate control device using the three-way valve can suppress the initial pressure variation and/or the mutual interference among respective piping systems even if the set flow rate is varied. However, there are also the following issues in this structure.

The first issue is the impact of pressure loss. For example, when a cooling flow path of the target mold is narrow and the pressure loss is high, the flow rate characteristics vary greatly, which leads to the poor balance of flow rate characteristics. In this case, as shown in FIG. 9, the flow rate characteristics are not left-right symmetrical on the A-port side and the B-port side, and not only can the desired flow rate control not be performed, but also the total flow rate flowing to the C-port has a tendency to vary greatly according to the opening degree as the flow rate characteristics are not left-right symmetrical. To solve this problem, as shown in FIG. 10, a throttle orifice (throttle) is provided on the A-port side so as to cause the same loss as on the B-port side. Thus, the flow rate characteristics become left-right symmetrical, and even if the opening degree is varied, the total flow rate flowing to the C port becomes substantially constant, and the generation of pressure variation can be suppressed. However, due to the decrease of the total flow rate at the C port, it is necessary to increase the pump pressure to increase the supply rate in the case of insufficient flow rate.

The second issue is the generation of cavitation. As described above, if the opening degree of the valve on the A-port side is increased when the supply pressure of the pump is high, the differential pressure between the front and back of the throttle orifice provided on the secondary side of the A-port becomes high. In addition, since the flow rate of the fluid sharply throttled by the throttle orifice becomes extremely fast, and there is almost no back pressure on the secondary side, cavitation easily occurs due to a sharp pressure drop. Since cavitation not only produces vibration, but also becomes gas-liquid mixing due to generation of local bubbles, the back pressure varies, and the pressure difference varies along with it, as a result the flow rate control becomes unstable, resulting in adverse effects of internal damage of piping, etc. In order to suppress this cavitation, it is necessary to suppress the flow speed so that the pressure does not fall below a saturated water vapor pressure. However, since the secondary side of the throttle orifice is the backflow pipe to the tank, there is almost no back pressure, it is easy to become below the saturated water vapor pressure, it can be said that it is an environment that is very prone to generate cavitation.

The present invention is designed to solve the above-mentioned issues and aims to provide a flow rate control device capable of suppressing variation of supply pressure due to variation of set flow rate and suppressing influence of pressure loss and cavitation on the secondary side.

Technical Solution

In order to suppress the variation of supply pressure caused by the variation of set flow rate, the present invention adopts a structure in which a three-way valve is used as a flow control valve instead of a two-way valve to carry out flow rate control. In addition, in order to suppress the influence of pressure loss on the secondary side, the present invention adopts a structure in which a throttle orifice is provided on the A port (first outflow port) side of the three-way valve so that the flow rate characteristic on the A port (first outflow port) side is the same as the pressure loss on the B port (second outflow port) side. Furthermore, in order to suppress cavitation on the secondary side of the throttle orifice, the present invention adopts a multistage structure in which the throttle orifice decompresses in stages instead of one stage.

As shown in FIG. 11, by providing a multistage throttle orifice on the A port (first outflow port) side, the pressure of the fluid is decompressed in stages, thus the throttle orifice diameter can be increased, and as a result, the flow rate can be reduced. In addition, since the back pressure is applied to the secondary side of each stage, it is difficult to become below the saturated water vapor pressure, and the generation of cavitation can be suppressed. It should be stated that when the number of stages of the multistage throttle orifice is to be reduced, a method of reducing the throttle orifice on the upstream side, which is difficult to become below the saturated water vapor pressure is to be considered.

Here, regarding the multistage throttle orifice, if the multistage throttle orifice also functions as a throttle orifice for adjusting pressure balance, then it can be manufactured at a low cost, but if the throttle orifice is connected as a plurality of stages one by one in a piping manner, then the sealing position will increase and more space will be needed. Therefore, in the present invention, as shown in FIG. 12, by arranging the ting plates with throttle orifice in a plurality of stages, it is possible to reduce the sealing position compactly and greatly. Further, as shown in FIG. 13, further compactness and reduction in sealing position and manufacturing cost can be achieved by building the multistage throttle orifice in a valve adapter of the three-way valve. Actually, as shown in FIG. 14, a flow rate control device including a flow rate regulating valve consisted of three-way valve including a multistage throttle orifice, a flow meter, and a controller (control portion) is the present invention.

That is, the flow rate control device of the present application is characterized by comprising: a flow rate regulating valve that regulates a flow rate of fluid flowing in a flow path; a flow meter that measures the flow rate of the fluid flowing in the flow path; and a control portion that controls an opening degree of the flow rate regulating valve based on a measurement result of the flow meter, the flow rate regulating valve is a three-way valve for dividing to regulate fluid flowing in from an inflow port to a first outflow port and a second outflow port, the flow meter is connected to the second outflow port side, and a multistage throttle orifice for decompressing the pressure of the fluid in stages is provided on the first outflow port side.

In addition, in the flow control device of the present invention, the structure, in which the multistage throttle orifice is built in a valve adapter of the three-way valve, may be adopted.

In addition, in the flow control device of the present invention, the structure, in which the multistage throttle orifice is arranged with a plurality of ting plates, and the ting plates have tapered throttle orifices whose apertures are narrowed from an inlet to an outlet, may be adopted.

Technical Effect

According to the flow rate control device of the present invention, by adopting a three-way valve configuration for the flow rate regulating valve, which divides to regulate the fluid flowing in from the inflow port to the first outflow port and the second outflow port, it is possible to suppress the variation of the pump supply pressure caused by the variation of the set flow rate. In addition, by adopting a configuration in which a throttle orifice is provided on the first outflow port side such that the flow rate characteristic on the first outflow port side of the three-way valve becomes the same pressure loss to that on the second outflow port side as a flow rate control target, the influence of the pressure loss on the secondary side can be suppressed. In addition, by adopting a structure in which a multistage throttle orifice for decompressing the pressure of the fluid in stages is provided on the first outflow port side, cavitation caused by a lower back pressure on the secondary side can be suppressed.

A LIST OF REFERENCE NUMBERS

Figure 1:
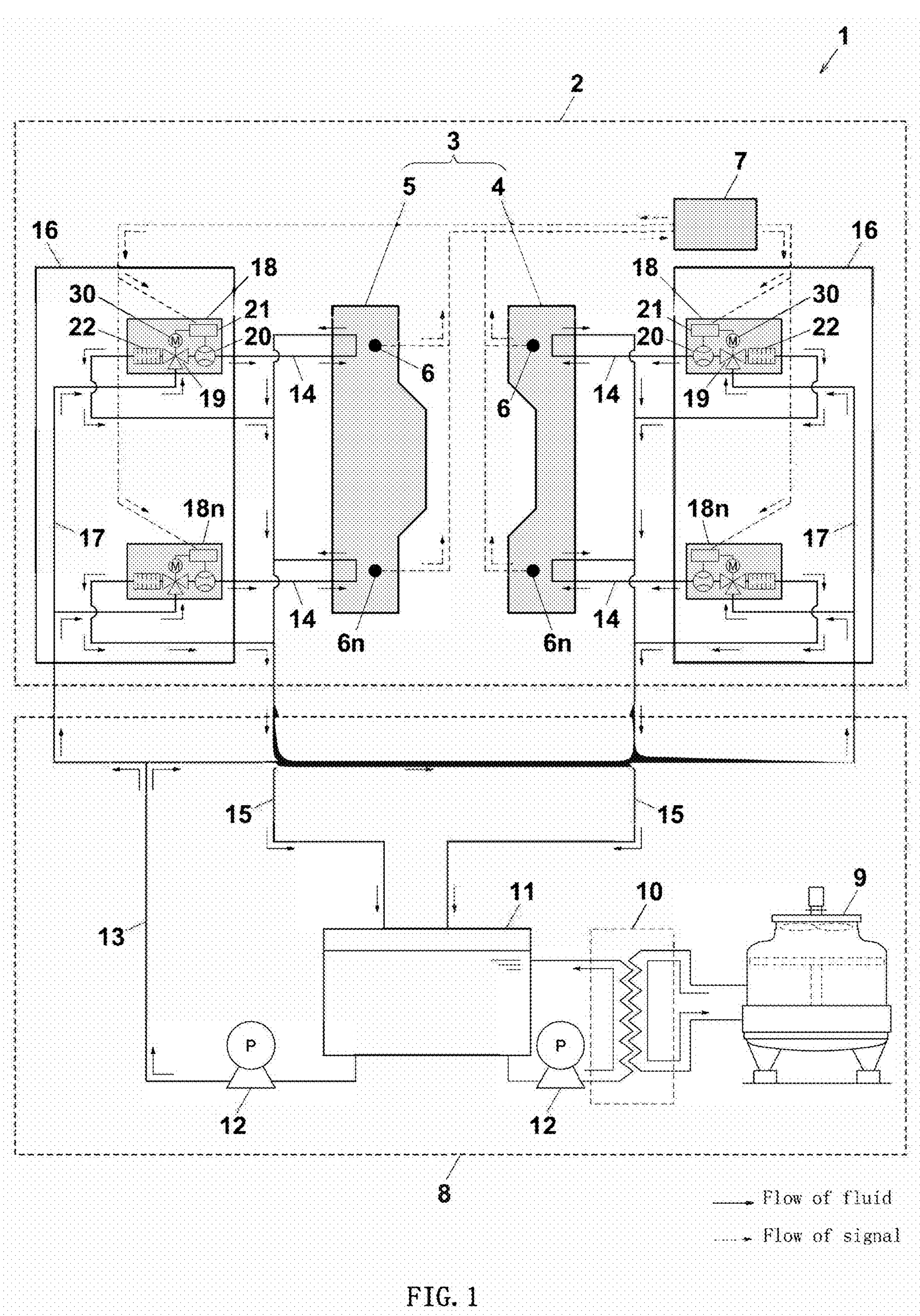
FIG. 1 is an overall diagram showing an example in which a flow rate control device of the present invention is applied to a mold temperature control system.

1: mold temperature control system
2: die casting machine
3: mold
4: fixed mold
5: movable mold
6: temperature sensor
7: control device
8: cooling water circulating device
9: cooling tower
10: heat exchanger
11: tank
12: pump
13: water supply pipe
14: mold pipe
15: backflow pipe
16: flow rate control unit
17: manifold
18: flow rate controller
19: flow rate regulating valve
20: flow meter
21: controller
22: multistage throttle orifice
23: adapter
24: inflow port
25: first outflow port
26: second outflow port
27: valve body
28: valve core
29: actuator
30: stepping motor
31: motor bracket
32: valve shaft
33: valve
34: sliding O-ring
35: shaft packing
36: retainer lock
37: screw
38: magnet
39: magnetic sensor
40: Hall IC
41: rectifying plate
42: wave washer
43: valve adapter
44: ring plate
45: tapered throttle orifice
46: L-shaped elbow

DETAILED DESCRIPTION

In the following, reference to the drawings will be made to explain the way of implementing the present invention.

FIG. 1 shows an embodiment of constructing a mold temperature control system using the flow rate control device of the present invention. The mold temperature control system 1 of the present embodiment is a system for controlling the temperature of the mold 3 by changing the flow rate of cooling water controlled at a constant flow rate during production in a die casting machine 2 for producing (casting) an aluminum die casting product. The mold 3 forms a part of the die casting machine 2 and consists of a fixed mold 4 provided in an injection device and a movable mold 5 provided in a mold clamping device.

A temperature sensor 6 ( . . . 6*n*) composed of a thermocouple or a temperature measuring resistor is mounted at respective parts of the mold 3 (the fixed mold 4 and the movable mold 5). The temperature sensor 6 detects the highest temperature, the lowest temperature, the average temperature, and the current temperature of the mold 3 during the production cycle in real time. The detected temperature information of the mold 3 is converted into an electrical signal and output to a control device 7 that performs an arithmetic process described later.

As a mechanism for adjusting the temperature of the mold 3, a cooling water circulating device 8 for circulating cooling water is provided outside the die casting machine 2. The cooling water circulating device 8 is configured to include a cooling tower 9, a heat exchanger 10, a tank 11, and a pump 12. The water in the tank 11 is cooled by the cooling tower 9 via the heat exchanger 10. The cooling water is supplied by the pump 12 through a water supply pipe 13 and a mold pipe 14 to cooling water holes provided in the respective parts of the mold 3, and circulates to the tank 11 through a backflow pipe 15.

A flow rate control unit 16 is mounted on the mold 3 (the fixed mold 4 and the movable mold 5), respectively. The flow rate control unit 16 includes a manifold 17 connected to the water supply pipe 13 and an aggregate of a plurality of flow rate controllers 18 ( . . . 18*n*) coupled to the manifold 17. In the manifold 17, cooling water from the water supply pipe 13 is introduced into a cavity via a strainer (not shown), and is branched at a plurality of ports to be supplied to the respective flow rate controllers 18 ( . . . 18*n*).

Figure 2:
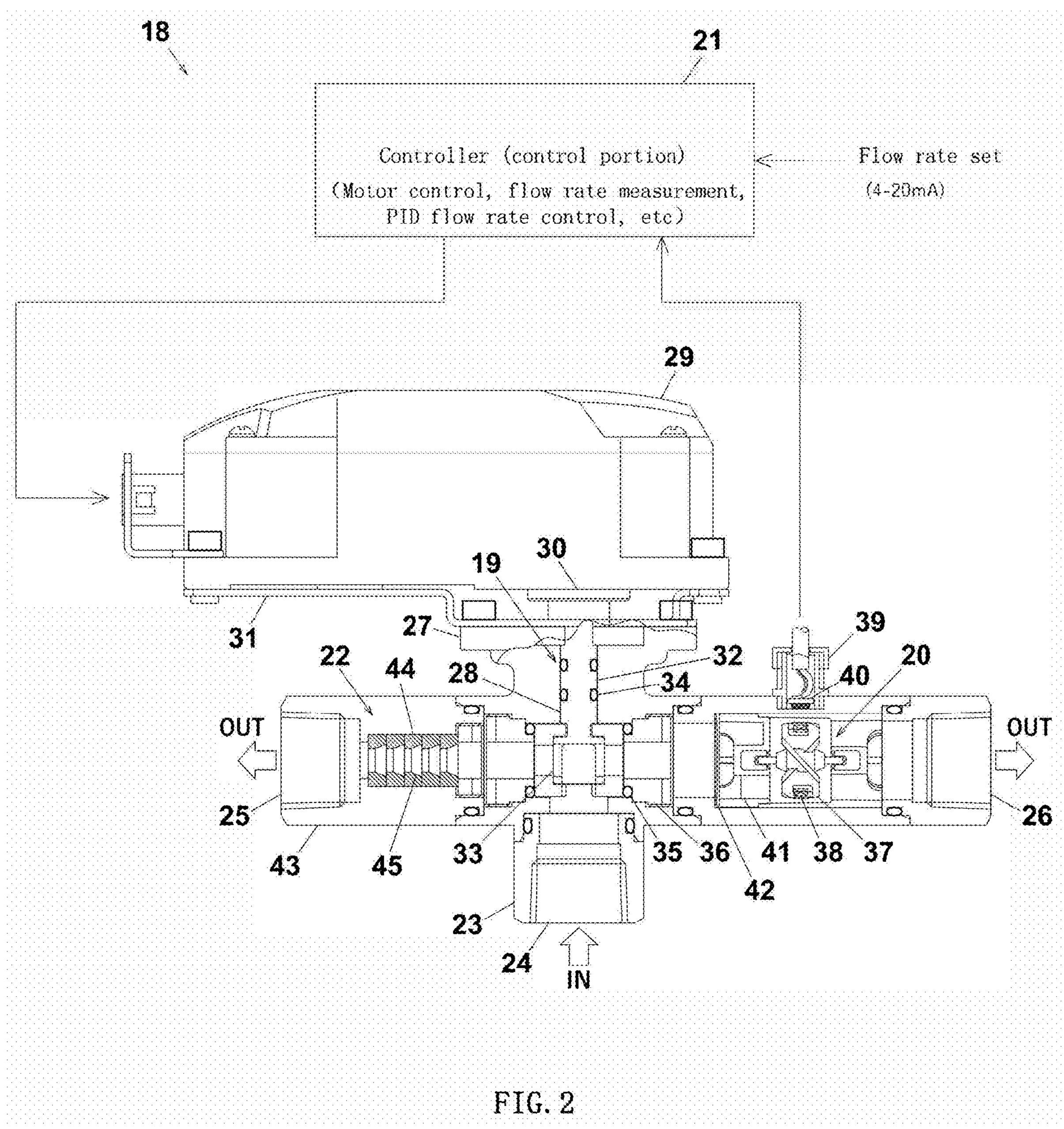
FIG. 2 is a partial cross sectional view showing the configuration of the flow rate control device of the present invention.

The flow rate controller 18 is a flow rate control device for controlling the instantaneous flow rate of cooling water which cools the respective parts of the mold 3 (the fixed mold 4 and the movable mold 5). As shown in FIG. 2, the flow rate controller 18 includes a flow rate regulating valve 19, a flow meter 20, a controller (control portion) 21, and a multistage throttle orifice 22, and is connected to a port of the manifold 17 via an adapter 23.

The flow rate regulating valve 19 is a three-way valve of a dividing type which divides fluid flowing in from an inflow port 24 to a first outflow port 25 and a second outflow port 26 and adjusts the flow rate ratio flowing out of the two outflow ports. The inflow port 24 is connected to the water supply pipe 13 for supplying cooling water from the pump 12, and the first outflow port 25 is connected to the backflow pipe 15 for returning the cooling water to the tank 11. In addition, the second outflow port 26 is connected to the mold pipe 14 for supplying cooling water to the cooling water hole of the mold 3, and a pipe system on the side (one side) of the second outflow port 26 is as a flow rate control object.

The flow rate regulating valve 19 of the present embodiment adopts an electric rotary valve mechanism, and drives a valve core 28 built in a valve body 27 by electric force of an actuator 29, and adjusts valve opening degree by the electric force. The actuator 29 has a built-in stepping motor 30 and is mounted to a valve body 27 via a motor bracket 31. The valve core 28 includes a valve shaft 32 and a valve 33 provided at the front end thereof and is coupled to a rotating shaft of the stepping motor 30. It should be noted that 34 denotes a sliding O-ring, 35 denotes a shaft packing for pressing the valve shaft 32 to act as a throttle orifice, and 36 denotes a retainer lock for pressing the shaft packing 35 to fix it.

Figure 3:
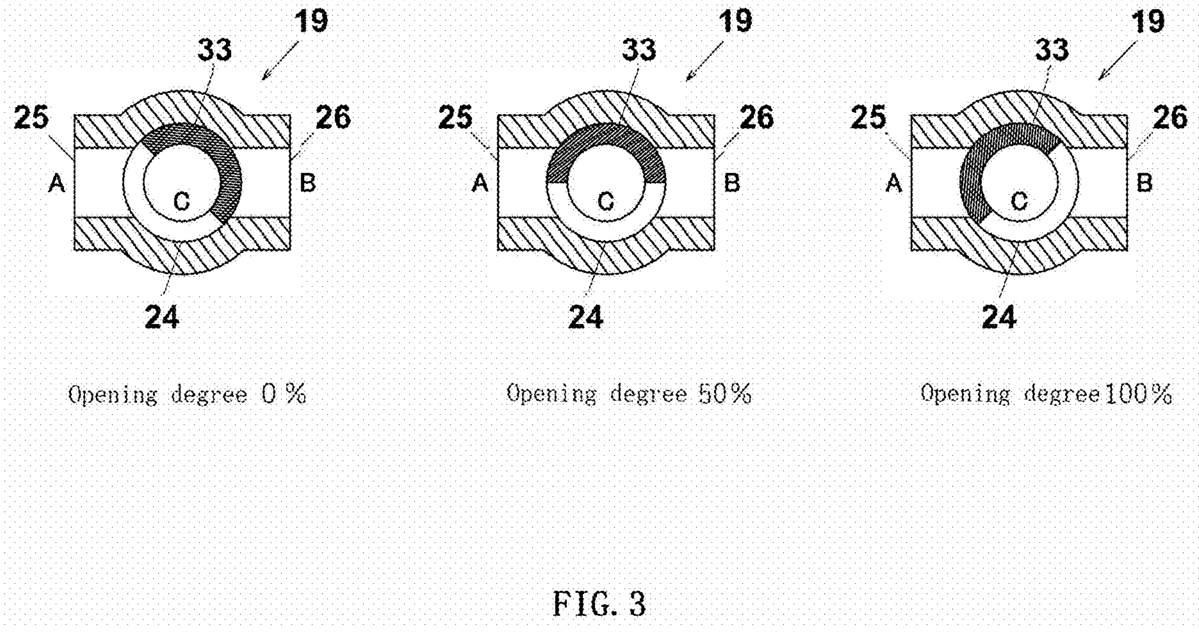
FIG. 3 is a schematic view showing a switching mode of a flow rate control valve in the flow rate control device of the present invention.

As shown in FIG. 3, the flow rate regulating valve 19 constituted by a three-way valve is configured that, when an opening portion of the second outflow port (B port) 26 is switched from a fully closed state (opening degree 0%) to a fully open state (opening degree 100%), then along with this, the opening portion of the first outflow port (A port) 25 is switched from the fully open state to the fully closed state, and the flow rate ratio of cooling water flowing out of the two outflow ports (A and B ports) can be adjusted. It should be noted that even if the valve 33 of the valve core 28 rotates so that the flow rate ratio of the cooling water flowing out from the first outflow port (A port) 25 and the second outflow port (B port) 26 vary, the flow rate (total flow rate) of the cooling water flowing in from the inflow port (C port) 24 is substantially constant.

The flow meter 20 measures the flow rate of the fluid flowing out of the second outflow port 26 and an impeller type flow meter is used in the present embodiment. The impeller type flow meter is configured to include a screw 37 supported in a flow path so as to be rotatable, and a magnetic sensor 39 for detecting a magnet 38 sealed by a blade portion of the screw 37. The magnetic sensor 39 is a non-contact sensor having a Hall IC 40 comprising of a Hall element, a power supply circuit, an amplifier, and the like built in, the Hall IC 40 detects a magnetic field of the magnet 38 and outputs an electrical signal to the controller 21. It should be noted that 41 denotes a rectifying plate for rectifying so as to prevent turbulence of the fluid flowing into the flow path after flow dividing, and the rectifying plate 41 also serves as a bearing for the screw 37. In addition, 42 denotes a wave washer for pressing the rectifying plate 41 to prevent loosening.

The controller (control portion) 21 is a microcomputer having functions of flow measurement, motor control, PID flow control and the like. The controller 21 measures a flow rate value calculated based on the rotational speed of the screw 37 according to the electrical signal output from the magnetic sensor 39. The controller 21 controls the stepping motor 30 of the actuator 29 based on the measured flow rate value and a set flow rate value input from the control device 7, and performs feedback control (PID control) on the opening degree of the flow rate regulating valve 19.

Figure 4:
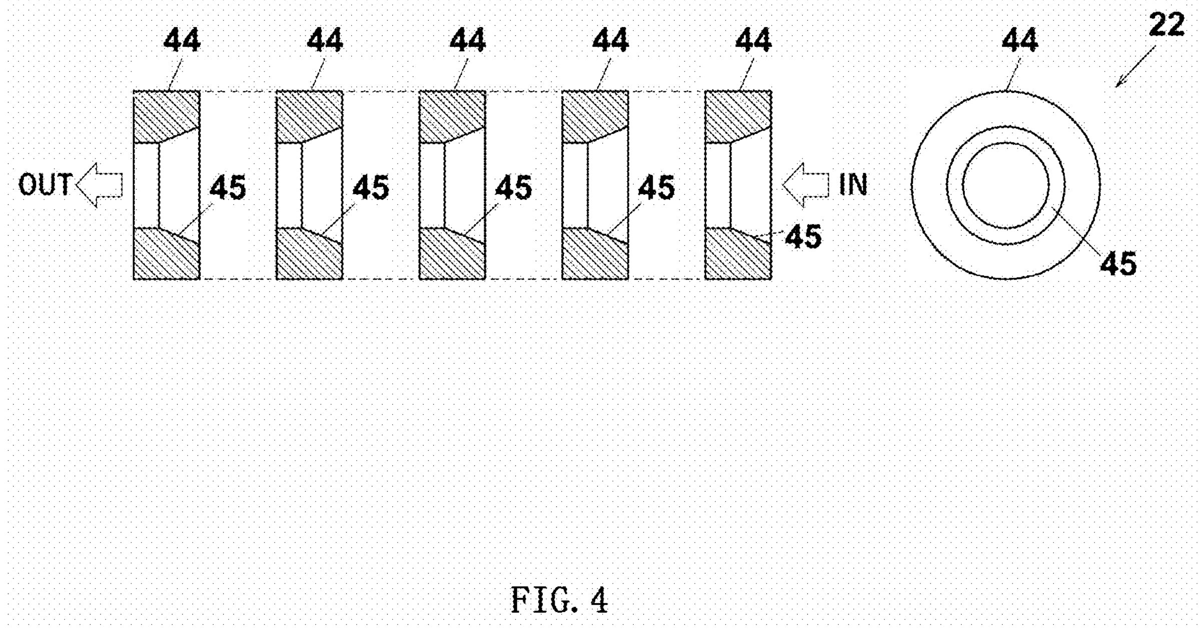
FIG. 4 is an enlarged exploded view showing the configuration of a multistage throttle orifice in the flow rate control device of the present invention.

The multistage throttle orifice 22 decompresses the pressure of the fluid flowing out of the first outflow port 25 in stages, and the multistage throttle orifice 22 has a function of adjusting a pressure balance and a function of suppressing cavitation. The multistage throttle orifice 22 of the present embodiment is built in a valve adapter 43 connected to the valve body 27 so that compactness and reduction of the sealing position are achieved. In addition, As shown in an enlarged view in FIG. 4, the multistage throttle orifice 22 is arranged in a thickness direction by a plurality of ring plates 44 (five in the present embodiment), so that the multistage throttle orifice 22 is compact and not easily clogged with dirt. On one side (inlet side) of each ring plate 44, a tapered throttle orifice 45 whose aperture gradually narrows from an inlet to an outlet is provided.

As described above, according to the flow rate controller 18 of the present embodiment, by controlling the distribution amounts of the first outflow port 25 and the second outflow port 26 using a three-way valve in the flow rate control valve 19, it is possible to suppress a variation of a supply pressure of the pump 12 according to the flow rate of the flowing cooling water, and to suppress mutual interference among respective piping systems. In addition, a tapered throttle orifice 45 is provided within the valve adapter 43 so as to prevent deterioration in a balance of flow rate characteristics due to a difference in a back pressure between the first outflow port 25 side and the second outflow port 26 side, thereby enabling precise flow rate control. In addition, by adopting the multistage throttle orifice 22 in which a plurality of ring plates 44 having the tapered throttle orifice 45 are arranged, the pressure of the fluid flowing out of the first outflow port 25 can be decompressed in stages, and cavitation caused by lower back pressure can be suppressed.

Figure 5:
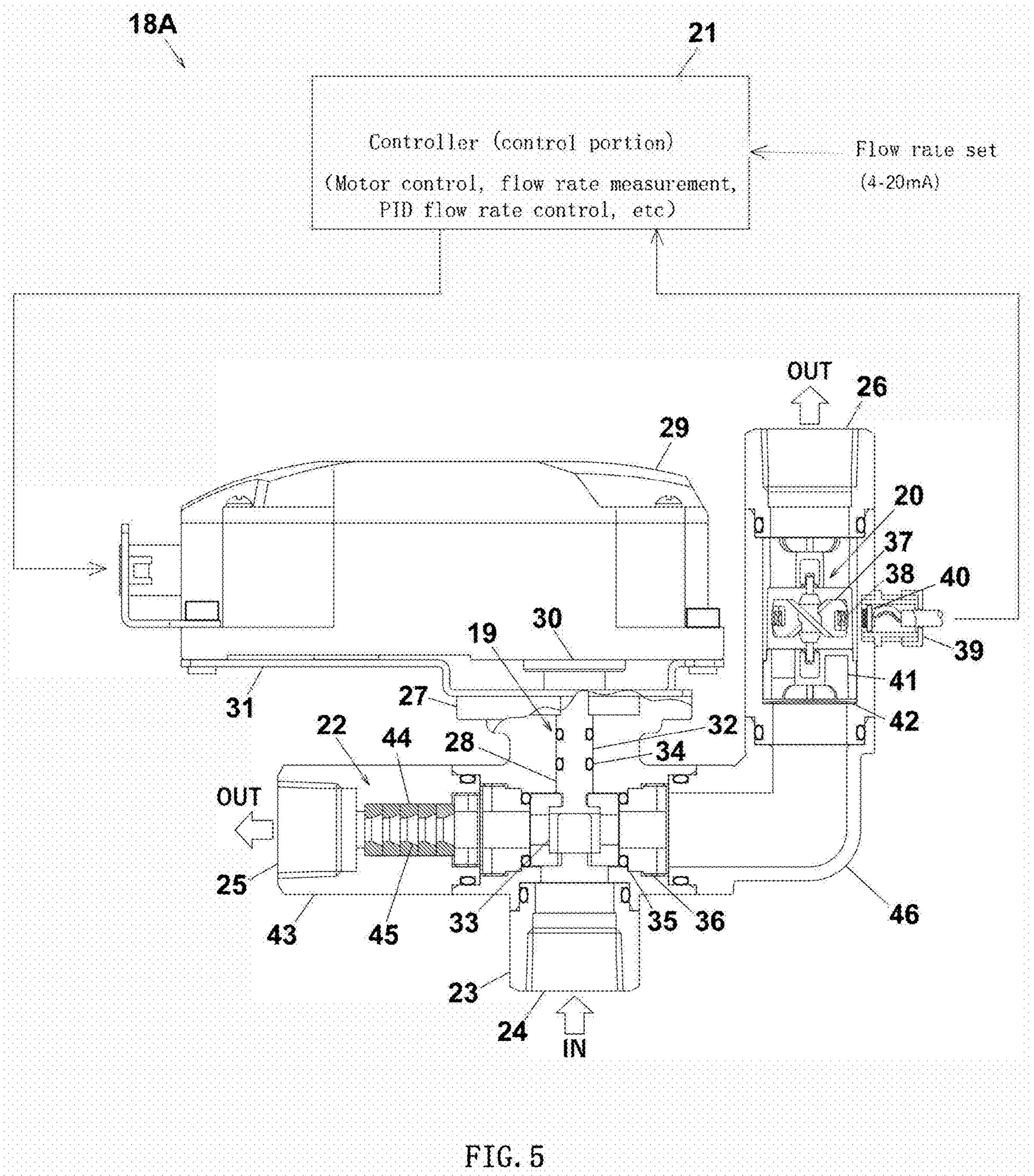
FIG. 5 is a partial cross sectional view showing a variation example of the flow rate control device of the present invention.
Figure 6:
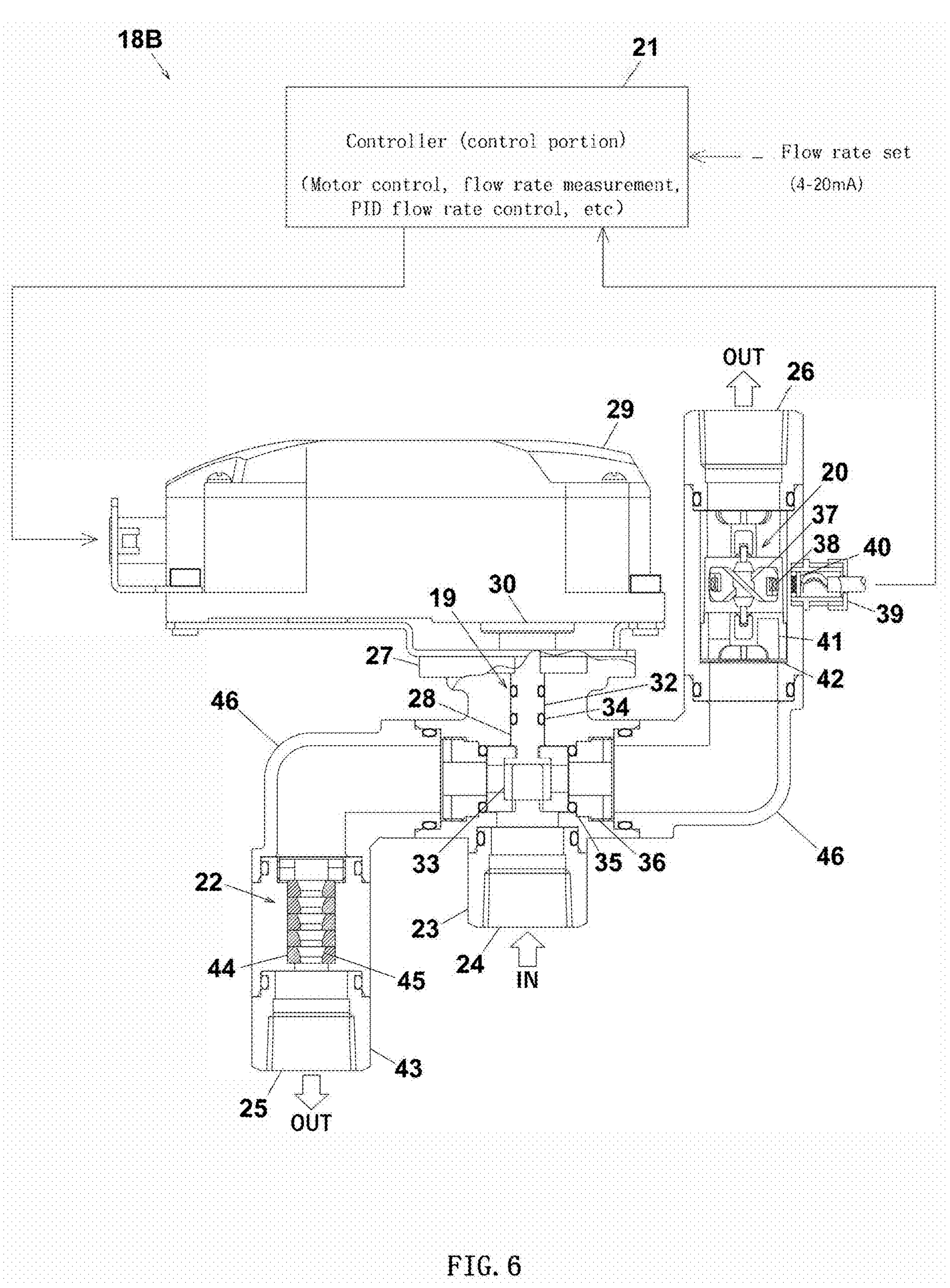
FIG. 6 is a partial cross sectional view showing a variation example of the flow rate control device of the present invention.
Figure 7:
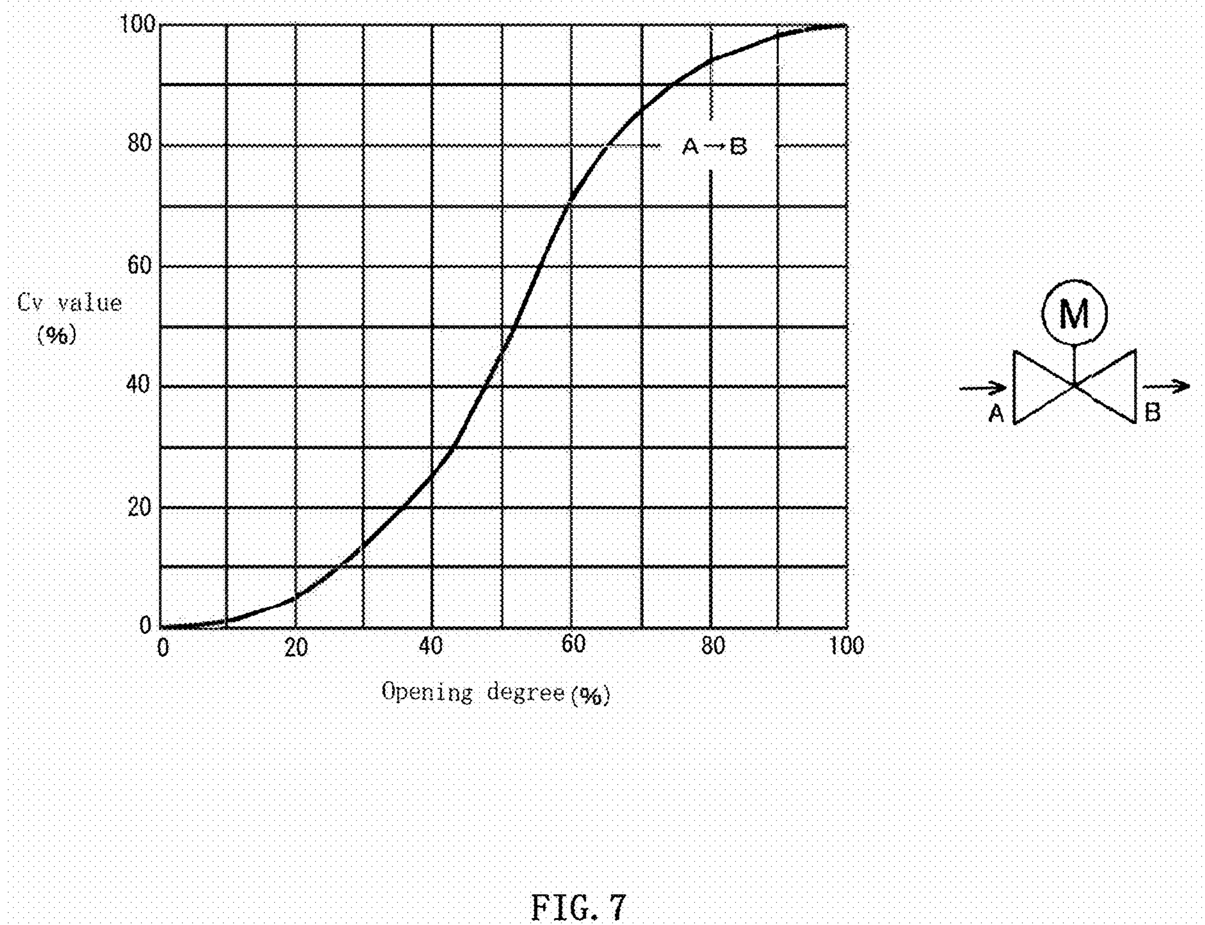
FIG. 7 is an explanatory view showing a general flow rate characteristic of a two-way valve.
Figure 8:
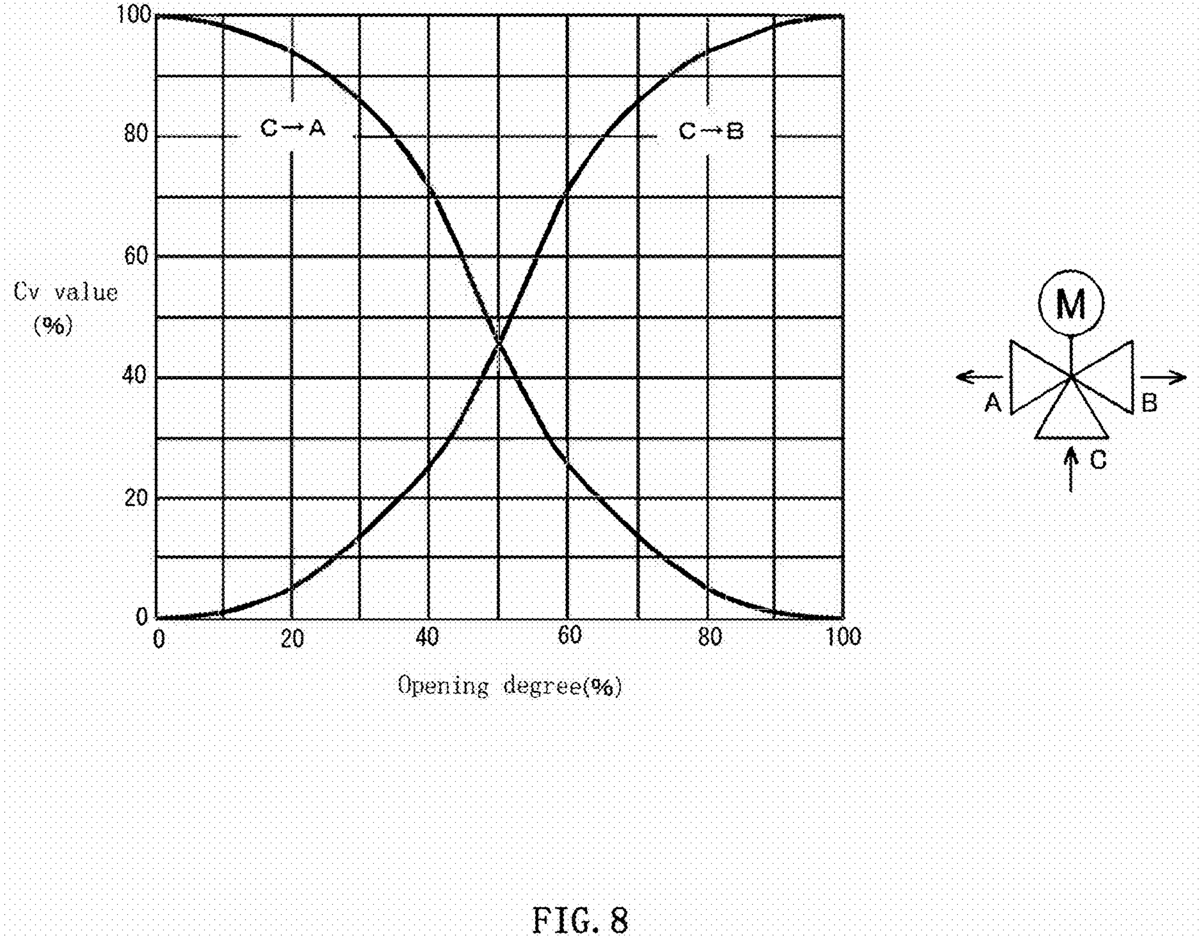
FIG. 8 is an explanatory view showing a general flow rate characteristic of a three-way valve.
Figure 9:
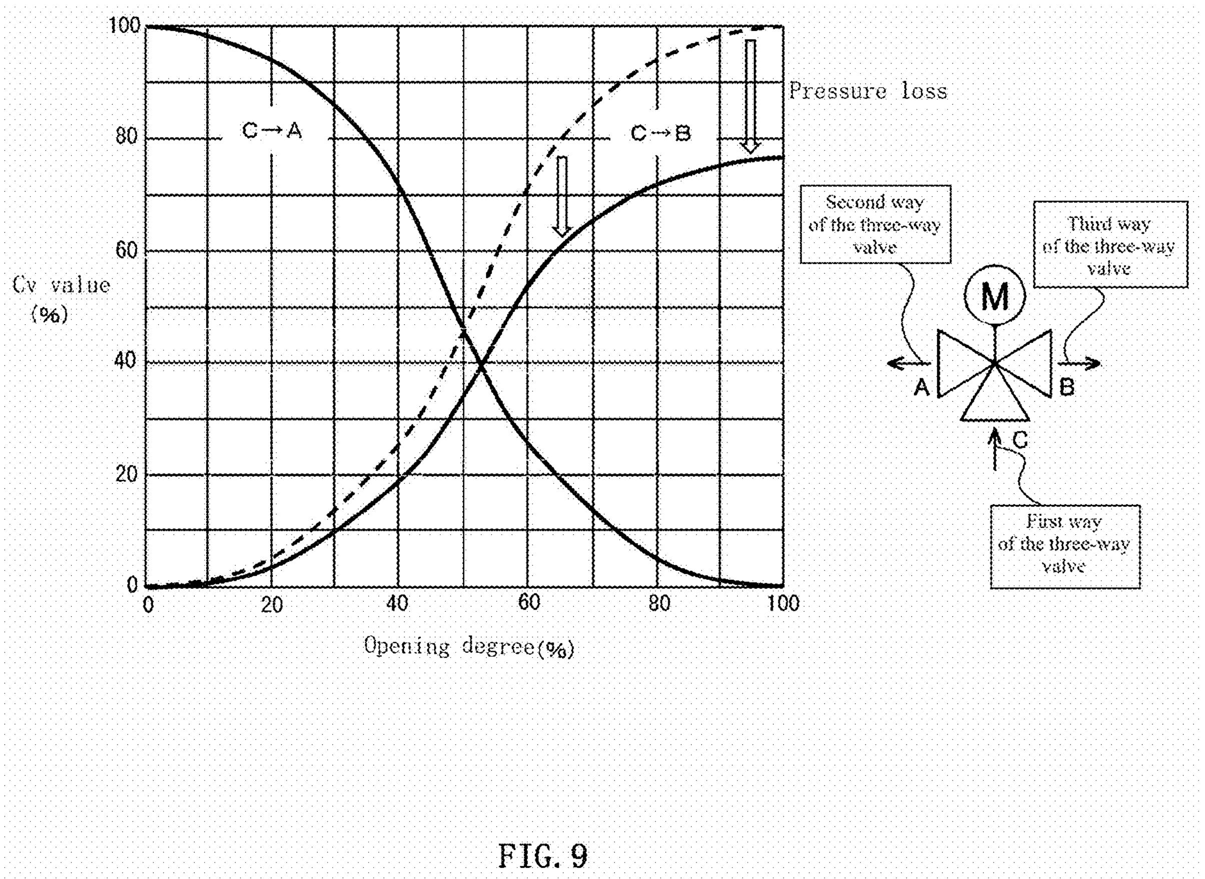
FIG. 9 is an explanatory view showing flow rate characteristics in the case that there is pressure loss on the B port side of the three-way valve.
Figure 10:
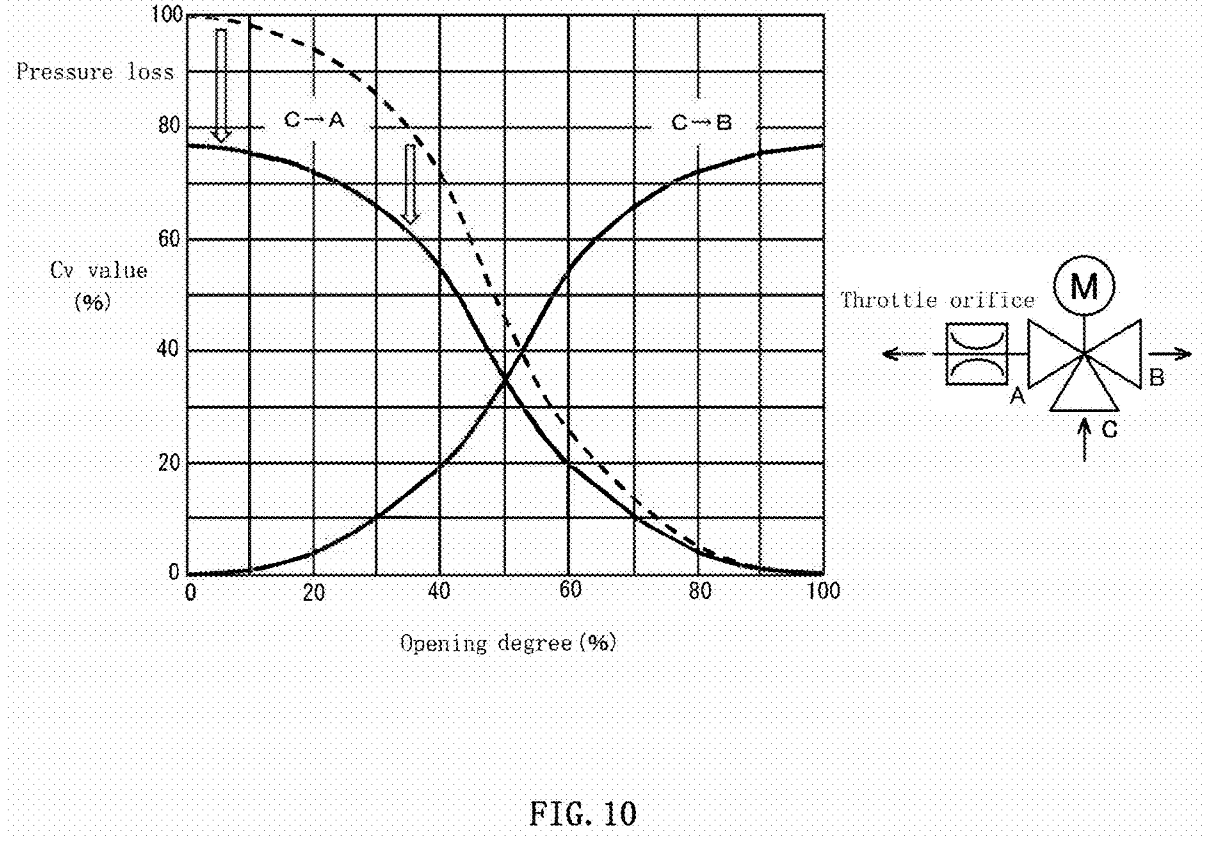
FIG. 10 is an explanatory view showing flow rate characteristics when a throttle orifice is provided on the A port side of a three-way valve.
Figure 11:
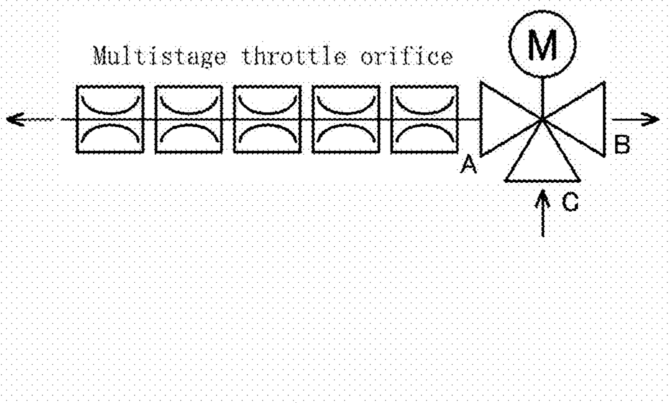
FIG. 11 is an explanatory view showing a configuration in which a multistage throttle orifice is provided on the A port side of a three-way valve.
Figure 12:
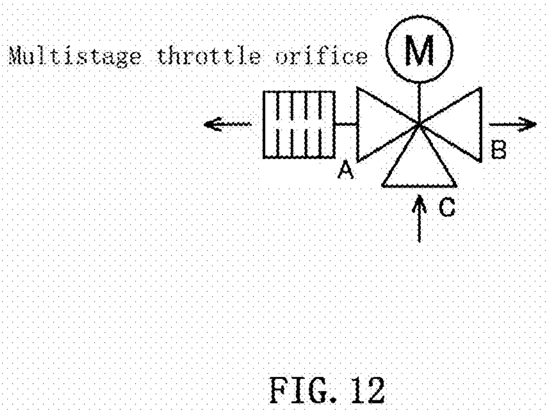
FIG. 12 is an explanatory view showing a configuration in which a multistage throttle orifice is provided by arranging ring plates on the A port side of a three-way valve.
Figure 13:
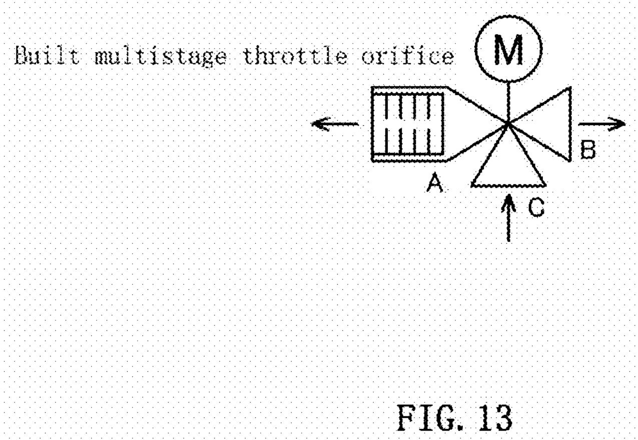
FIG. 13 is an explanatory view showing a configuration in which a valve adapter on the A port side of a three-way valve has built-in a multistage throttle orifice.
Figure 14:
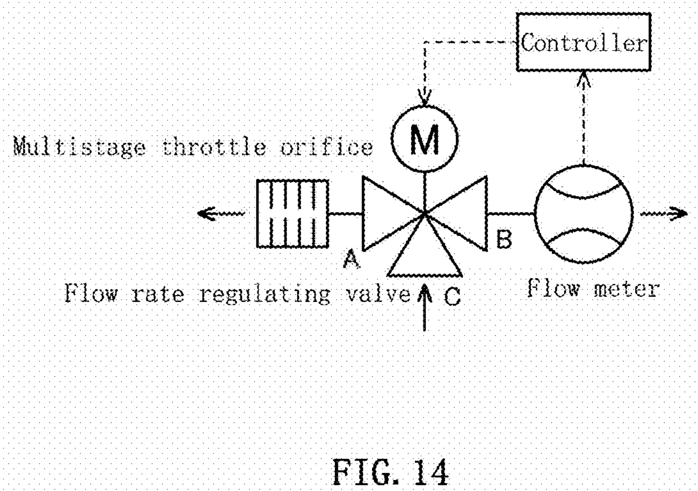
FIG. 14 is an explanatory view showing a flow rate control device including a flow rate regulating valve including a three-way valve containing a multistage throttle orifice, a flow meter, and a controller (control portion).

It should be noted that, although a T-shaped three-way valve is used as the flow rate regulating valve 19 constituting the flow rate controller 18 in the above-described embodiment, variation examples such as those shown in FIGS. 5 and 6 may be used. Since the valve throttle of the flow regulating valve 19 is provided at the inlet of the flow meter 20, it can be considered that there are adverse effects on the flow characteristics due to turbulence from the valve. Therefore, for the purpose of preventing such adverse effects, the flow rate controller 18A shown in FIG. 5 connects the flow meter 20 to the valve body 27 via a L-shaped elbow 46, and the flow rate controller 18B shown in FIG. 6 further connects the multistage throttle orifice 22 to the valve body 27 via the L-shaped elbow 46. In this way, by making piping zigzag by using the L-shaped elbow 46, the fluid flowing in the flow path collides with an inner wall, thus extreme turbulence can be suppressed in a short distance. Moreover, in the case of the impeller type flow meter according to the present embodiment, a sliding resistance of a shaft of the screw 37 is reduced by making a mounting position of the flow meter 20 vertical, thus the low flow rate characteristic is improved and the flow rate measurement can be performed in a wide range.

In the above described embodiment, the mold temperature control system of the die casting machine is constructed using the flow rate control device of the present invention, but an application example of the present invention is not limited thereto. For example, in a piping system provided with a plurality of injection molding machines using cooling water and/or a machine tool using cutting oil and so on, the present invention can be applied to a purpose of changing a supply amount of fluid such as cooling water, a refrigerant liquid, a cutting oil, etc. according to a variation in the number of operating tables of the machine. It should be stated that in the mold temperature control system described above, the instantaneous flow rate of the cooling water is controlled by the flow rate controller, but an accumulated flow rate may be controlled by controlling the instantaneous flow rate and counting an accumulated value.

The invention claimed is:

1. A flow rate control device disposed in a flow path branching into a first flow path from an inflow port connected to a water supply pipe to a first outflow port connected to a backflow pipe, and a second flow path from the inflow port connected to the water supply pipe to a second outflow port connected to a mold pipe, and configured to control a flow rate of fluid supplied from the water supply pipe to the mold pipe, the flow rate control device comprising:

a flow rate regulating valve configured to regulate an instantaneous flow rate of the fluid flowing in the flow path;

a flow meter configured to measure the flow rate in the second flow path and produce continuous measurement results of the flow rate; and a controller configured to receive the continuous measurement results of the flow rate, and instantaneously control an opening degree of the flow rate regulating valve on each of the continuous measurement results of the flow rate produced by the flow meter, thereby controlling the instantaneous flow rate, wherein the flow rate regulating valve is a three-way flow dividing valve configured to:

divide the fluid entering through the inflow port connected to the water supply pipe into the first flow path leading to the first outflow port connected to the backflow pipe, and the second flow path leading to the second outflow port connected to the mold pipe, and adjust a flow rate ratio flowing out of the first and second outflow ports, wherein the flow rate of the fluid entering through the inflow port remains constant even when the flow rate ratio flowing out of the first and second outflow ports changes, wherein the flow meter is located in the second flow path proximal to the second outflow port, and a multistage throttle orifice is located in the first flow path proximal to the first outflow port, wherein the multistage throttle orifice is formed by arranging a plurality of ring plates directly adjacent to one another in a thickness direction, each of the plurality of ring plates having a tapered throttle orifice, wherein the tapered throttle orifice comprises:

a first aperture defining an inlet at a first end and tapering gradually from the first end toward a second end opposite the first end;

a second aperture defining an outlet, the second aperture extending from the second end of the first aperture toward the outlet and having a cylindrical shape with a constant diameter, and wherein the constant diameter of the second aperture is equal to a diameter of the first aperture at the second end.

2. The flow rate control device according to claim 1, wherein the multistage throttle orifice is built in a valve adapter of the three-way flow dividing valve, and wherein a first way of the three-way flow dividing valve connects to the inflow port, a second way of the three-way flow dividing valve connects to the first outflow port, and a third way of the three-way flow dividing valve connects to the second outflow port.

3. The flow rate control device according to claim 1, wherein the flow rate regulating valve connects the flow meter to the second outflow port via a L-shaped elbow, wherein an inner wall of the L-shaped elbow suppresses fluid turbulence in the second flow path.

4. The flow rate control device according to claim 1, wherein the flow rate regulating valve connects the multistage throttle orifice to the first outflow port via a first L-shaped elbow wherein an inner wall of the first L-shaped elbow suppresses fluid turbulence in the first flow path, and the flow rate regulating valve connects the flow meter to the second outflow port via a second L-shaped elbow wherein the inner wall of the second L-shaped elbow suppresses fluid turbulence in the second flow path.

5. The flow rate control device according to claim 1, wherein the tapered throttle orifice disposed within each of the plurality of ring plates has substantially the same inlet size.

6. The flow rate control device according to claim 1, wherein the tapered throttle orifice disposed within each of the plurality of ring plates has substantially the same outlet size.

7. The flow rate control device according to claim 1, wherein the flow rate regulating valve is an electric rotary valve configured to drive a valve core built in a valve body by electric force of an actuator and adjust the opening degree by the electric force.

8. The flow rate control device according to claim 7, wherein the actuator includes a built-in stepping motor and is disposed on the valve body by a motor bracket.

9. The flow rate control device according to claim 8, wherein the controller controls the stepping motor of the actuator based on the continuous measurement results of the flow rate and a set flow rate value input, and performs feedback control (PID control) on the opening degree of the flow rate regulating valve.

10. The flow rate control device of claim 2, wherein the valve adapter is connected to a valve body of the three-way flow dividing valve and is disposed directly adjacent to the first outflow port.

11. The flow rate control device of claim 1, wherein the flow meter is disposed directly adjacent to the second outflow port, the flow meter including:

a screw disposed in the second flow path, and configured to be rotatable;

a magnetic sensor protruding outward from a side of the flow meter, and configured to detect a magnetic field of a magnet sealed by the screw and output an electrical signal to the controller;

a rectifying plate disposed in a distal end of the flow meter that is farther from the second outflow port, and configured to prevent turbulence of the fluid flowing into the second flow path; and a wave washer disposed adjacent to the rectifying plate, and configured to press the rectifying plate to prevent loosening.

12. The flow rate control device of claim 1, wherein the inlet of one tapered throttle orifice directly contacts the outlet of another tapered throttle orifice within the multistage throttle orifice.

* * * * *